(12) United States Patent
Zhou et al.

(10) Patent No.: US 12,189,264 B2
(45) Date of Patent: Jan. 7, 2025

(54) TRAVELING WAVEGUIDE IN MACH-ZEHNDER MODULATOR TO FACILITATE PHASE MATCH AND IMPEDANCE MATCH

(71) Applicant: Intel Corporation, Santa Clara, CA (US)

(72) Inventors: Jianying Zhou, Dublin, CA (US); Jin Hong, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 552 days.

(21) Appl. No.: 17/397,724

(22) Filed: Aug. 9, 2021

(65) Prior Publication Data

US 2021/0373410 A1  Dec. 2, 2021

Related U.S. Application Data

(60) Provisional application No. 63/174,459, filed on Apr. 13, 2021.

(51) Int. Cl.
*G02F 1/21* (2006.01)
*G02F 1/225* (2006.01)

(52) U.S. Cl.
CPC .......... *G02F 1/2255* (2013.01); *G02F 1/212* (2021.01); *G02F 1/218* (2013.01); *G02F 1/2257* (2013.01); *G02F 2201/12* (2013.01); *G02F 2202/10* (2013.01)

(58) Field of Classification Search
CPC ........ G02F 1/212; G02F 1/218; G02F 1/2255; G02F 1/2257; G02F 2201/12; G02F 2202/10; G02B 6/02252; G02B 6/02285; G02B 6/02333; G02B 6/02342; G02B 6/02352; G02B 6/02537; G02B 6/02361; G02B 6/02366; G02B 6/024
See application file for complete search history.

(56) References Cited

U.S. PATENT DOCUMENTS

| | | | | |
|---|---|---|---|---|
| 9,523,871 | B2 * | 12/2016 | Kitamura | G02F 1/218 |
| 9,939,708 | B2 * | 4/2018 | Aimone | G02F 1/2257 |
| 10,133,142 | B2 * | 11/2018 | Doerr | G02F 1/025 |
| 10,180,588 | B1 * | 1/2019 | Lewen | G02F 1/025 |
| 10,191,350 | B2 * | 1/2019 | Yu | G02F 1/2257 |
| 10,317,709 | B2 * | 6/2019 | Tsuzuki | G02F 1/025 |
| 10,330,961 | B2 * | 6/2019 | Latrasse | G02F 1/025 |
| 10,409,093 | B2 * | 9/2019 | Nejadmalayeri | G02F 1/0121 |
| 10,416,525 | B2 * | 9/2019 | Zhou | G02F 1/0121 |
| 10,678,115 | B2 * | 6/2020 | Yu | G02F 1/2257 |
| 10,908,474 | B2 * | 2/2021 | Vitic | G02F 1/2255 |

(Continued)

*Primary Examiner* — Ryan A Lepisto
(74) *Attorney, Agent, or Firm* — Schwabe, Williamson & Wyatt, P.C.

(57) ABSTRACT

Embodiments described herein may be related to apparatuses, processes, and techniques directed to phase match and impedance match to enable a higher baud rate for ultra-high-speed TW-MZM for 100 Gbaud or above for PAM applications, and/or 120 Gbaud or above for QAM applications. Embodiments described herein may include ultra-high-speed TW-MZM based on differential signal-to-signal (SS) TW using a push-pull PN structure. These embodiments facilitate high speeds for a TW-MZM due to decreased complexity by eliminating a ground in the TW. Other embodiments may be described and/or claimed.

20 Claims, 16 Drawing Sheets

(56) References Cited

U.S. PATENT DOCUMENTS 11,307,481 B2 * 4/2022 Yoo .................. G02F 1/025
11,378,826 B2 * 7/2022 Kissa ................ G02F 1/011
11,460,724 B2 * 10/2022 Latrasse ............ G02F 1/025

* cited by examiner

TRAVELING WAVEGUIDE IN MACH-ZEHNDER MODULATOR TO FACILITATE PHASE MATCH AND IMPEDANCE MATCH

RELATED APPLICATION

This application claims priority to U.S. Provisional Application No. 63/174,459 filed Apr. 13, 2021. The specification of this application is hereby incorporated by reference in its entirety.

FIELD

Embodiments of the present disclosure generally relate to the field of semiconductor devices and packaging, and in particular to optical and radiofrequency (RF) waveguides.

BACKGROUND

Continued growth in computing and mobile devices will continue to increase the demand for increased bandwidth density within and between dies of semiconductor devices and packages.

DETAILED DESCRIPTION

Figure 1:
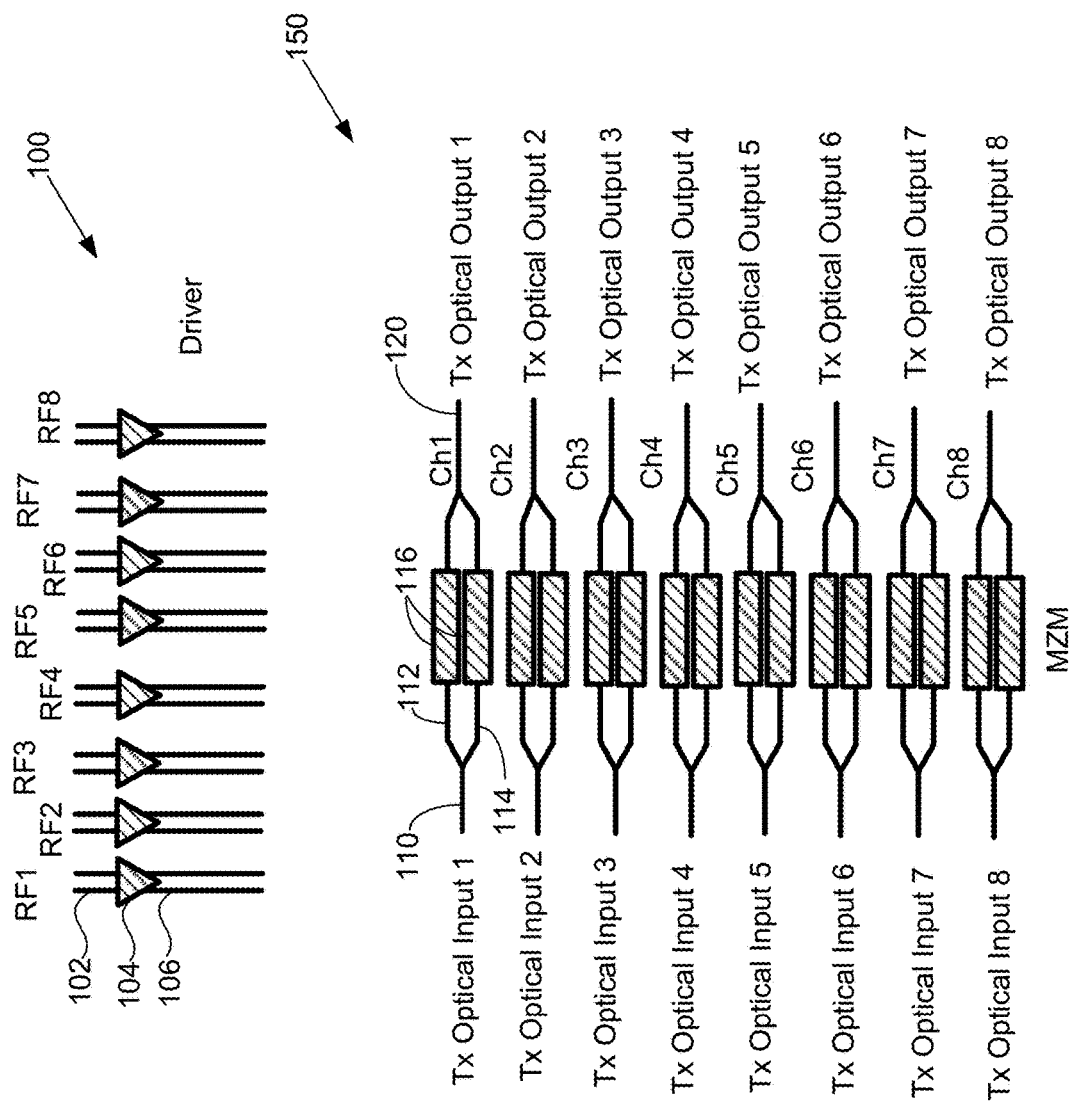
FIG. 1 illustrates a block diagram of a pulse amplitude modulation (PAM) transmitter (Tx) with 8 optical channels that enables a 1.6 Tb per second (Tb/s) transceiver with 200 Gb/s per lane, in accordance with various embodiments.

Embodiments described herein may be related to apparatuses, processes, and techniques related to phase match and impedance match to enable a higher baud rate for ultra-high-speed TW-MZM operating at 100 Gbaud or above for PAM applications, and/or at 120 Gbaud or above for QAM applications. Embodiments described herein may include ultra-high-speed TW-MZM based on differential signal-to-signal (SS) TW using a push-pull PN structure. These embodiments facilitate high speeds for a TW-MZM due to decreased complexity by eliminating a ground in the TW.

Embodiments described herein may include phase match techniques between optical and RF traveling waves within a TW for ultra-high-speed modulation response and efficiency. These techniques may include (1) symmetric SS RF TW, (2) phase match at a Nyquist frequency or higher frequency, and/or (3) phase match achieved via doping, PN bias, and RF waveguide optimization. These embodiments facilitate phase match at a frequency at or higher than a Nyquist frequency and can improve electro-optical (EO) bandwidth and facilitate modulation efficiency for a high baud rate PAM or QAM modulation.

Embodiments described herein may include RF termination methods for ultra-high-speed TW MZM by using (1) an impedance match termination network that operates over a wide operating frequency range at or around a Nyquist frequency for RF TW, and/or (2) impedance match that is achieved using a RLC network. In these embodiments, an RF terminal network may be designed with a terminal impedance to match a characteristic impedance of the TW to improve back reflection and thus performance on ultra-high-speed optical characteristics for higher baud rate PAM and QAM modulation.

Legacy implementations use RF TWs with a ground (GND) with phase matching at a low frequency and impedance matching at a low frequency with a terminal resistor. Legacy implementations will have a phase mismatch at high frequencies which reduces the modulation efficiency at high frequencies and therefore result in low bandwidth. Legacy impedance match solutions will cause and impedance mismatch and thus high back reflection at high frequencies which will degrade high-speed signal performance.

Data transmission capacity requirements continue to increase in data centers. Data transmission capacity can be increased by higher baud rate per optical channel or electric lane, or by more parallel optical channels or electric lanes at lower baud rate. However, the technique by increasing baud rate has a benefit on the size, power consumption, cost, and the like may be superior to the technique that uses additional parallel optical channels or lanes, which has a linear increase in hardware with an increase in channel or lane count.

In next generation 100 Tb/s or above switch, higher baud rate TW-MZM may facilitate these applications. For example, a 100 Gbaud modulator can facilitate 200 Gb/s or above per electrical lane or optical channel with PAM4 or above, which is desirable for 3.2 Tb/s per module with 16 channels to enable 100 Tb/s or above switch with 32 modules. For a longer reach, QAM modulation and coherent detection may be needed. A photonic in phase and quadrature (IQ) modulator based on 120 Gbd TW-MZM may facilitate a single carrier 0.8 Tb/s with 16 QAM or above, which is desirable for 3.2 T/s per module with 4 optical carriers to enable 100 Tb/s or above switch with 32 modules.

A challenge for ultra-high-speed TW MZM design is to achieve high modulation efficiency and bandwidth. Legacy RF TW-MZM uses RF TW with GND, e.g. single-ended structures such as GSG or GS, or differential structures such as GSGSG or GSSG. Differential signal-to-signal (SS) RF structure with push pull PN structure may facilitate high speed for TW-MZM due to the simplicity by eliminating a ground in TW. However, such approach may raise stringent design requirements for ultra-high-speed modulation of TW-MZM.

RF index and characteristic impedance of RF TW under doping conditions are frequency dependent. The frequency dependence of an RF effective refractive index or RF index will increase in traveling waveguides with the increase in RF frequency. The legacy methods for the phase match between RF and optical travelling waves at low frequency will have low EO modulation efficiency at a Nyquist frequency and thus small bandwidth, which will degrade the performance of high baud rate modulation applications.

The frequency dependence of characteristic impedance of traveling waveguides will increase with the increase in RF frequency. Legacy techniques for impedance match with resistors make it difficult to have the impedance match over a wide operating frequency range. This will cause high back reflection in some operating frequency ranges due to impedance mismatch, and thus deteriorate the high-speed optical characterization.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indi-rectly contact each other, but yet still cooperate or interact with each other, and may mean that one or more other elements are coupled or connected between the elements that are said to be coupled with each other. The term "directly coupled" may mean that two or more elements are in direct contact.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an ASIC, an electronic circuit, a processor (shared, dedicated, or group) and/or memory (shared, dedicated, or group) that execute one or more software or firmware programs, a combinational logic circuit, and/or other suitable components that provide the described functionality.

Various Figures herein may depict one or more layers of one or more package assemblies. The layers depicted herein are depicted as examples of relative positions of the layers of the different package assemblies. The layers are depicted for the purposes of explanation, and are not drawn to scale. Therefore, comparative sizes of layers should not be assumed from the Figures, and sizes, thicknesses, or dimensions may be assumed for some embodiments only where specifically indicated or discussed.

FIG. 1 illustrates a block diagram of a PAM Tx with 8 optical channels that enables a 1.6 Tb/s transceiver with 200 Gb per lane, in accordance with various embodiments. For legacy PAM applications, TW MZM are limited to 50-60 Gbaud and limited to supporting a maximum of 100 Gb/s per optical channel or electric lane with PAM4, 400 Gb/s with 4 optical channels or electric lanes, and 800 Gb/s with 8 optical channels or electric lanes. As shown in FIG. 1, a PAM architecture of a ultra-high-speed TW MZM that may operate at 100 Gbaud or above to achieve 200 Gb/s or above per optical channel or electrical lane with PAM4 or above, and thus achieve 1.6-3.2 Tb/s or above with 8-16 optical channels or electric lanes.

The PAM architecture of FIG. 1 includes a plurality of processed RF signals as shown in diagram 100, and a plurality of processed optical signals as shown in diagram 150. As discussed herein and further below, the RF signals of diagram 100 and the optical signals of diagram 150 may be combined into a plurality of TW. Diagram 100 shows a plurality of RF inputs 102 that are coupled, respectively, with a plurality of drivers 104 resulting in a plurality of RF outputs 106.

Diagram 150 shows a plurality of Tx optical inputs 110, that are split respectively in two branches 112, 114 that are then input, respectively to a push-pull PN phase shifter of MZM 116 that is for optical PAM modulation. The resulting optical output is combined to produce Tx optical output with modulated PAM signal 120.

Figure 2:
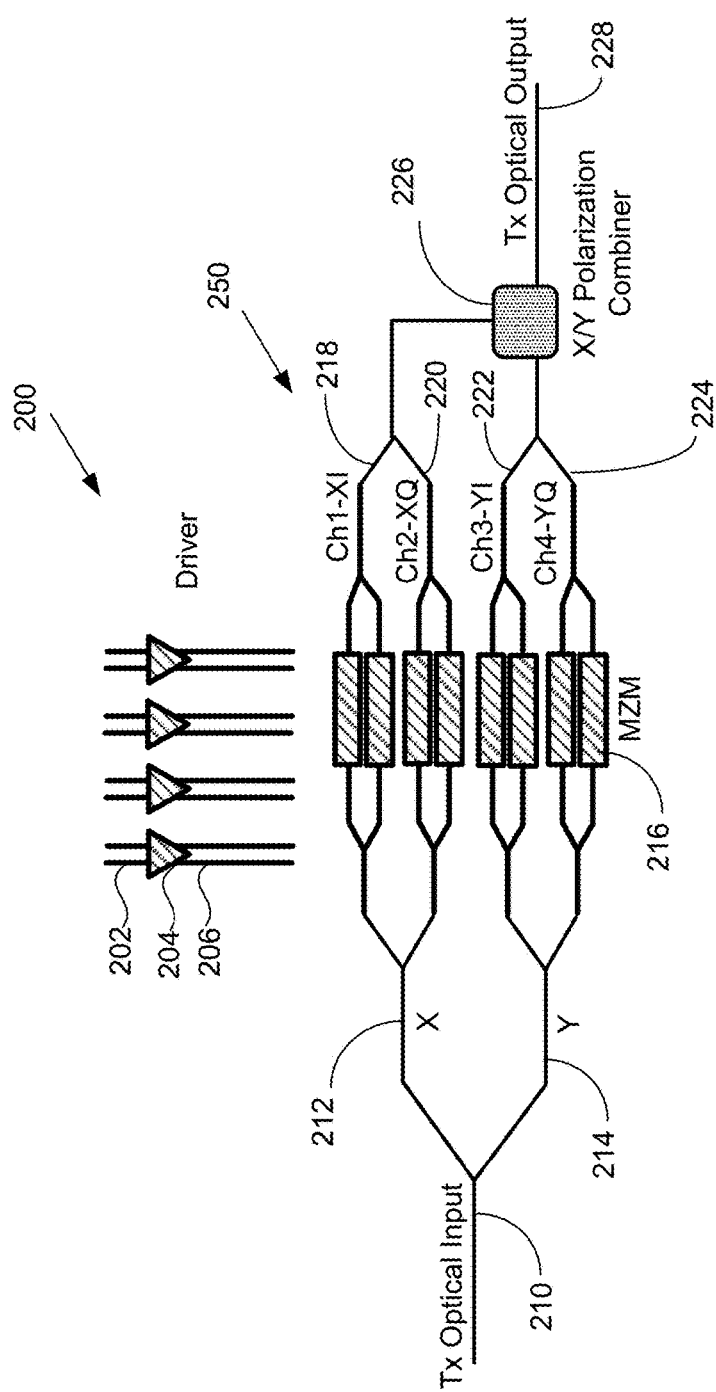
FIG. 2 illustrates a block diagram of a dual polarization quadrature amplitude modulation (QAM) Tx that enables 0.8 Tb/s transceiver with 120 Gbaud 16 QAM, in accordance with various embodiments.

FIG. 2 illustrates a block diagram of a dual polarization QAM Tx that enables 0.8 Tb/s transceiver with 120 Gbaud 16 QAM or above, in accordance with various embodiments. For coherent QAM applications, legacy TW MZM applications are limited to 60-69 Gbaud, and as a result support a maximum of 400-600 Gb/s with 16-64QAM with dual polarization IQ modulation based on TW MZM in single optical carrier. Embodiments described herein, and in particular with respect to FIG. 2, include ultra-high-speed TW MZM that may operate at 120 Gbaud or above, and thus achieve single optical carrier 0.8-1.2 Tb/s or above with 16-64QAM with dual polarization IQ modulation based on TW MZM.

As discussed herein and further below, the RF signals of diagram 200 and the optical signals of diagram 250 may be combined into a plurality of TW. Diagram 200 shows a plurality of RF inputs 202 that are coupled, respectively, with a plurality of drivers 204 resulting in a plurality of RF outputs 206.

Diagram 250 shows a Tx optical input 210, that is split into two branches, an X optical branch 212 and a Y optical branch 214. These branches are then subsequently split, until the sub branches are input, respectively, into a plurality of push-pull PN phase shifters of MZM 216, that is for optical QAM modulation. The resulting optical outputs are combined to produce a first channel 218 and a second channel 220 based upon optical branch X 212, and a third channel 222 and fourth channel 224 based upon optical branch Y 214. These optical branches may then be combined and may use a X/Y polarization combiner 226 to produce a Tx optical output with dual polarization modulated QAM signal 228.

Embodiments as described herein and below may be related to embodiments found within a push-pull PN phase shifter of MZM 116 of FIG. 1 and/or a plurality of push-pull phase PN shifters of MZM 216 of FIG. 2.

Figure 3:
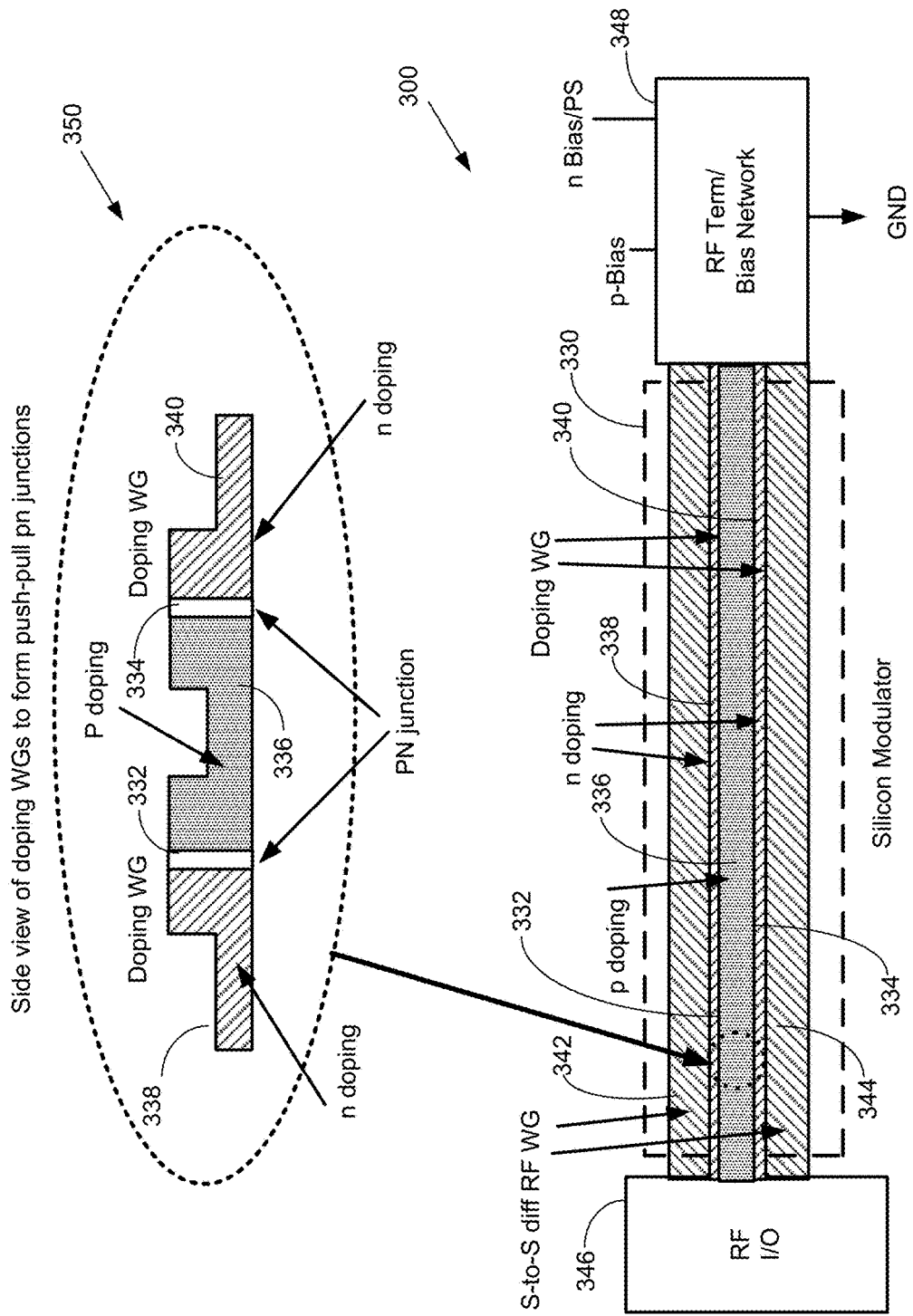
FIG. 3 illustrates a block diagram and explosion of a traveling waveguide (TW) Mach-Zehnder modulator (MZM) that includes signal-to-signal radiofrequency (RF) and push-pull PN structures, in accordance with various embodiments.

FIG. 3 illustrates a block diagram and explosion of a TW Mach-Zehnder modulator (MZM) that includes signal-to-signal RF and push-pull PN structures, in accordance with various embodiments. Diagram 300 shows a silicon modulator 330, which may be a TW MZM, that includes a first optical waveguide 332, and a second optical waveguide 334 that are separated by a P-doping material 336. In embodiments, the P-doping material 336 may include boron. The first optical waveguide 332 may be in contact with a first N-doping material 338, and the second optical waveguide 334 may be in contact with a second N-doping material 340. In embodiments, the N-doping material 338 and 340 may include phosphorus.

The RF waveguide may include a first electrode 342 and a second electrode 344. The first electrode 342 of the RF waveguide may be in contact with the first N-doping material 338, and a second electrode 344 of the RF waveguide may be in contact with the second N-doping material 340. In embodiments, the RF waveguide of silicon modulator 330 may be coupled at a one end with an RF input output (I/O) component 346, and may be coupled at the other end with a RF termination and/or bias network 348. As a result, in embodiments the first electrode 342 of the RF waveguide and the second electrode 344 of the RF waveguide form a signal to signal differential RF waveguide that does not require a physical ground directly coupled with either RF electrodes 342, 344.

In embodiments, the RF I/O component 346 may include RF transience from RF output of driver with RF structure such as different GSSG or GSGSG to RF input of a silicon photonic modulator with differential SS RF structure. In embodiments, the RF termination and/or bias network 344 may include bias connection for PN junctions and RLC termination with impedance match.

Cross-section 350 shows a cross-section of the silicon modulator 330, that includes the first N-doping layer 338, the first optical waveguide 332, the P-doping material 336, the second optical waveguide 334, and the second N-doping material 340. As a result, the PN junctions are formed in optical waveguides 332, 334, which forms push-pull PN configuration during operation.

Figure 4:
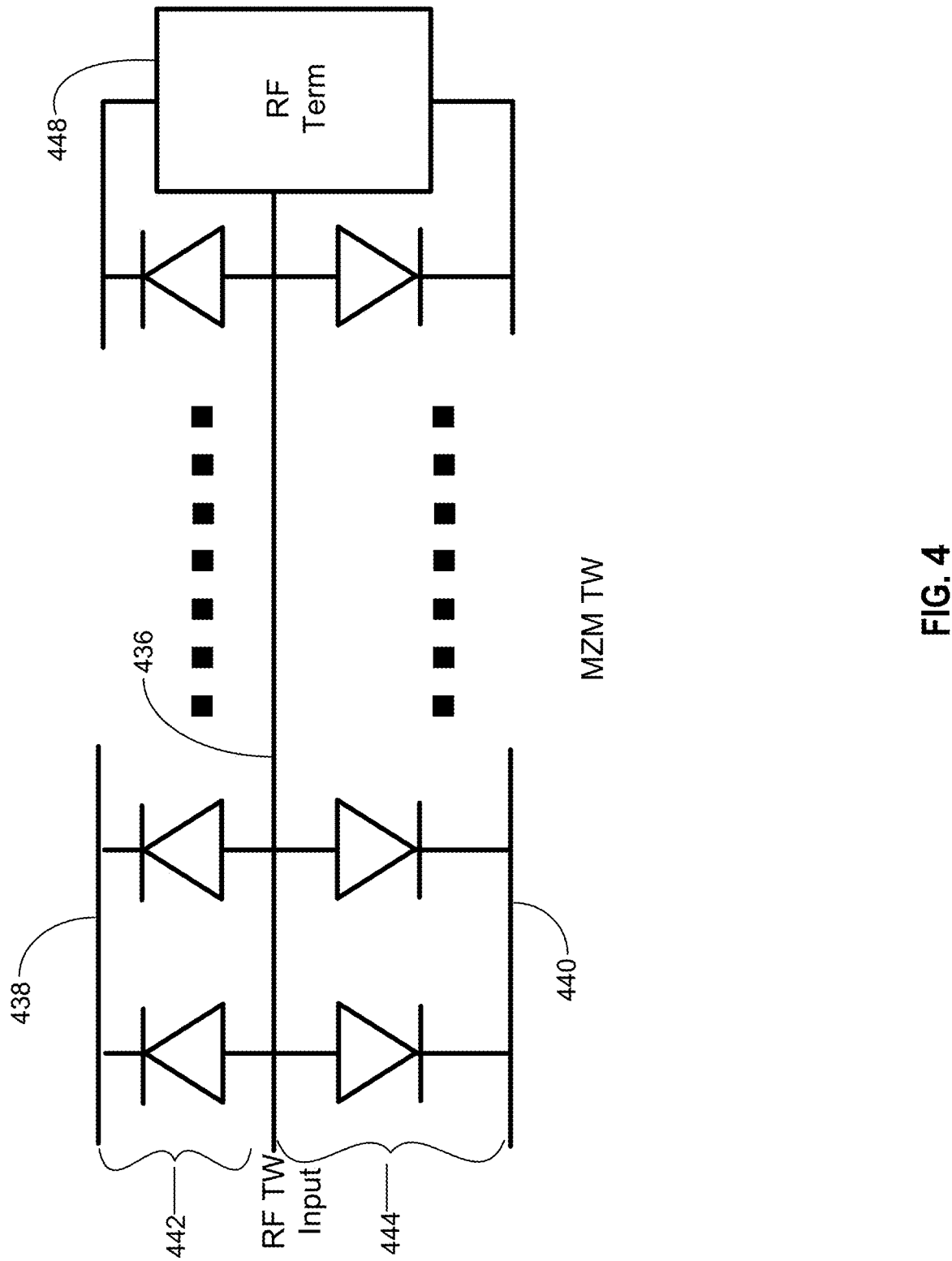
FIG. 4 illustrates a diagram of an equivalent circuit for the MZM TW of FIG. 3, in accordance with various embodiments.

FIG. 4 illustrates a diagram of an equivalent circuit for the MZM TW of FIG. 3, in accordance with various embodiments. In the equivalent circuit of FIG. 4, the RF termination 448, which may be similar to the RF termination and/or bias network 348 of FIG. 3, is at one end of the equivalent circuit. The other end of the equivalent circuit includes a RF input. The equivalent circuit represents electrical interactions with respect to the first PN junction 442, and the second PN junction 444, which may be PN junctions formed in optical waveguide 332 and second optical waveguide 334 of FIG. 3. The line 438 may correspond to the first N-doping layer 338, the line 440 may correspond to the second N-doping layer 340, and the line 436 may correspond to the P-doping layer 336.

Figure 5A:
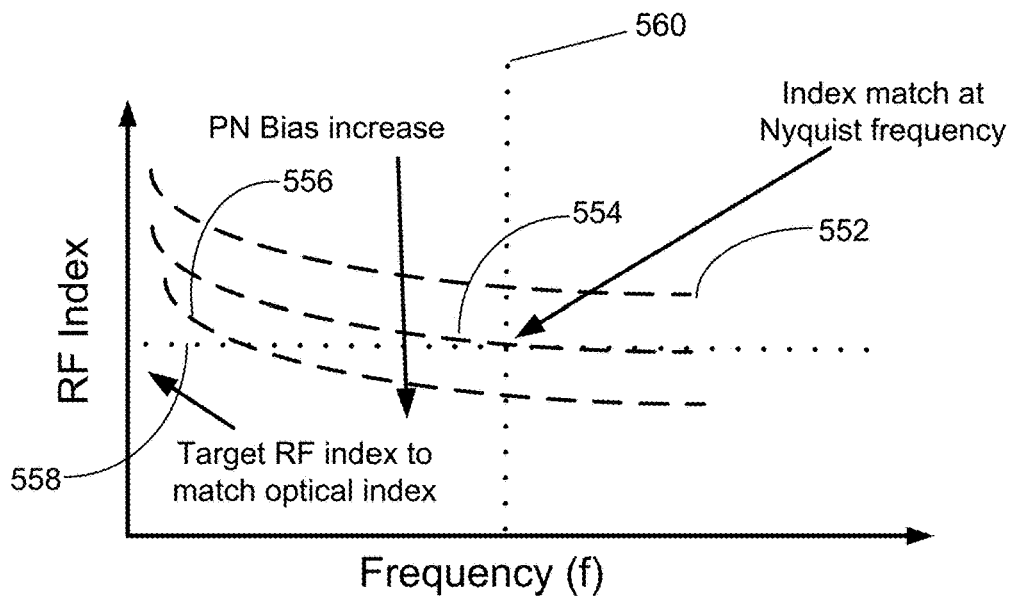
FIG. 5A-5B shows graphs that illustrate examples of frequency dependence of a RF index and frequency dependence of max phase mismatch.
Figure 5B:
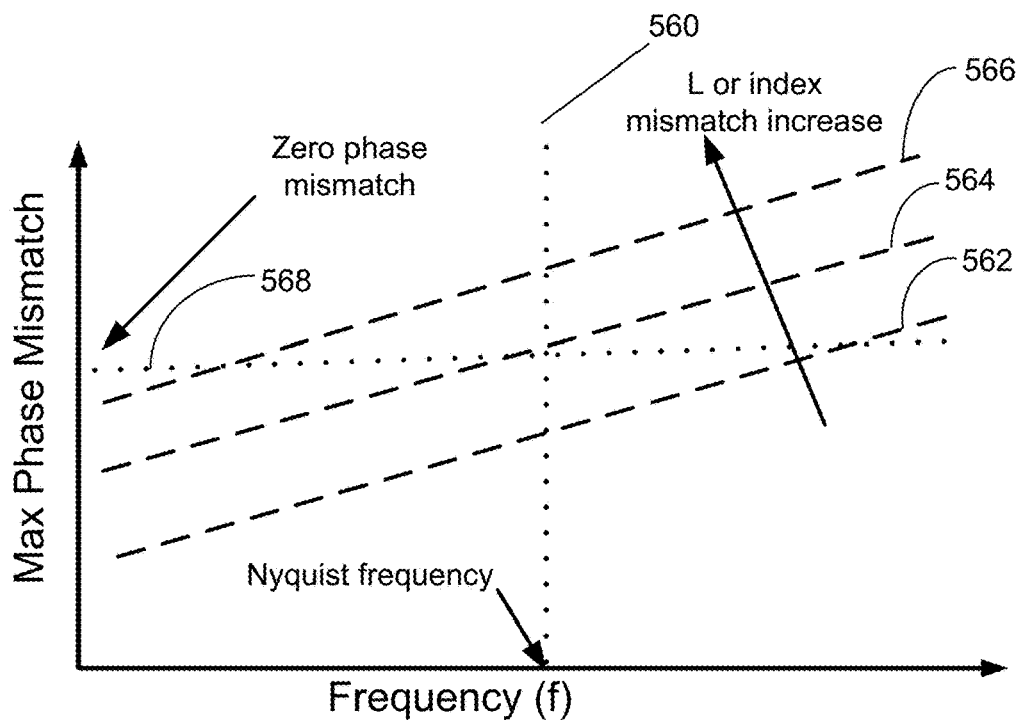

FIG. 5A-5B shows graphs that illustrate examples of frequency dependence of a RF index and frequency dependence of max phase mismatch.

Theoretical Background for Phase Match

The modulation EO response of TW-MZM (EO_Res) is dependent RF EE response (EE_Res) and EO conversion response (EO_Conv). The EO conversion is determined by phase match between RF and optical travelling waves. For small signal linear conditions, EO modulation of TW-MZM is achieved by optical phase modulation, $\delta\varphi\_EO\_Res$, which can be expressed by:

$$\delta\varphi\_EO\_RES = K_0 a V \int_0^L e^{-\alpha_m z} e^{j\Delta\varphi} dz \quad (1)$$

Where $K_0$ is the free-space wavenumber, a is the conversion factor from voltage to optical refractive index change, V is applied input RF voltage amplitude, $\alpha_m$ is RF attenuation long RF TW representing EE response, and $\Delta\varphi$ is phase mismatch due to the velocity mismatch or index mismatch between RF and optical travelling waves which can be expressed by:

$$\Delta\varphi = 2\pi f z \left( \frac{1}{v_o} - \frac{1}{v_m} \right) = 2\pi f z \left( \frac{n_o}{c} - \frac{n_m}{c} \right) \quad (2)$$

Where f is RF frequency, z is a position of the RF and optical waves traveling in forward direction, $v_m$ is the RF phase velocity, $v_o$ is optical velocity, c is optical free-space speed, $n_o$ is optical group index, $n_m$ is RF index.

In perfect phase match condition, EO phase modulation response is determined by RF TW EE response, which can be expressed by:

$$\delta\varphi\_EE\_Res = K_0 a V \int_0^L e^{-\alpha_m z} dz \quad (3)$$

In non-loss RF TW condition, EO phase modulation response is determined by phase match for EO conversion, which can be expressed by:

$$\delta\varphi\_EO\_Conv = K_0 a V \int_0^L e^{j\Delta\varphi} dz \quad (4)$$

Phase Matching

RF index is RF frequency dependent. TW-MZM for high-speed modulation requires phase match between optical and RF travelling waves, or the match between RF index of RF waveguide and optical group index of doped optical waveguide. The EO conversion is dependent on phase match between RF and optical traveling waves. The maximum phase mismatch after traveling L length of TW, $\Delta\varphi_L$, can be expressed by:

$$\Delta\varphi_L = 2\frac{\pi f L}{c}(n_o - n_m) \quad (5)$$

The maximum phase mismatch is proportion to index mismatch of RF and optical TW waveguides, RF frequency and TW length. Therefore, the phase mismatch can be enhanced with ultra-high-speed operation under the same index match and travelling WAVEGUIDE length. The phase mismatch can be over doubled for baud rate increase from 50 Gbd to over 100 Gbd.

FIG. 5A illustrates the frequency dependence of an RF index, on the vertical scale, versus frequency on the horizontal scale. As shown, as the PN bias increases in the direction shown, a different set of level curves 552, 554, 556 may be generated. Thus, the PN bias increase may be identified and said at a target RF index level 558 that corresponds with a match at the Nyquest frequency 560. With respect to FIG. 5A, the match may be obtained at level curves 554.

FIG. 5B illustrates the frequency dependence of a max phase mismatch, on the vertical scale and the frequency on a horizontal scale. As the length L or the index mismatch of the TW MZM increases as shown, various level curves 562, 564, 566 may be created. A zero phase mismatch may be indicated by the line 568. As a result, the level curve 564 best matches the zero phase mismatch 568 at the Nyquist frequency 560.

Figure 6:
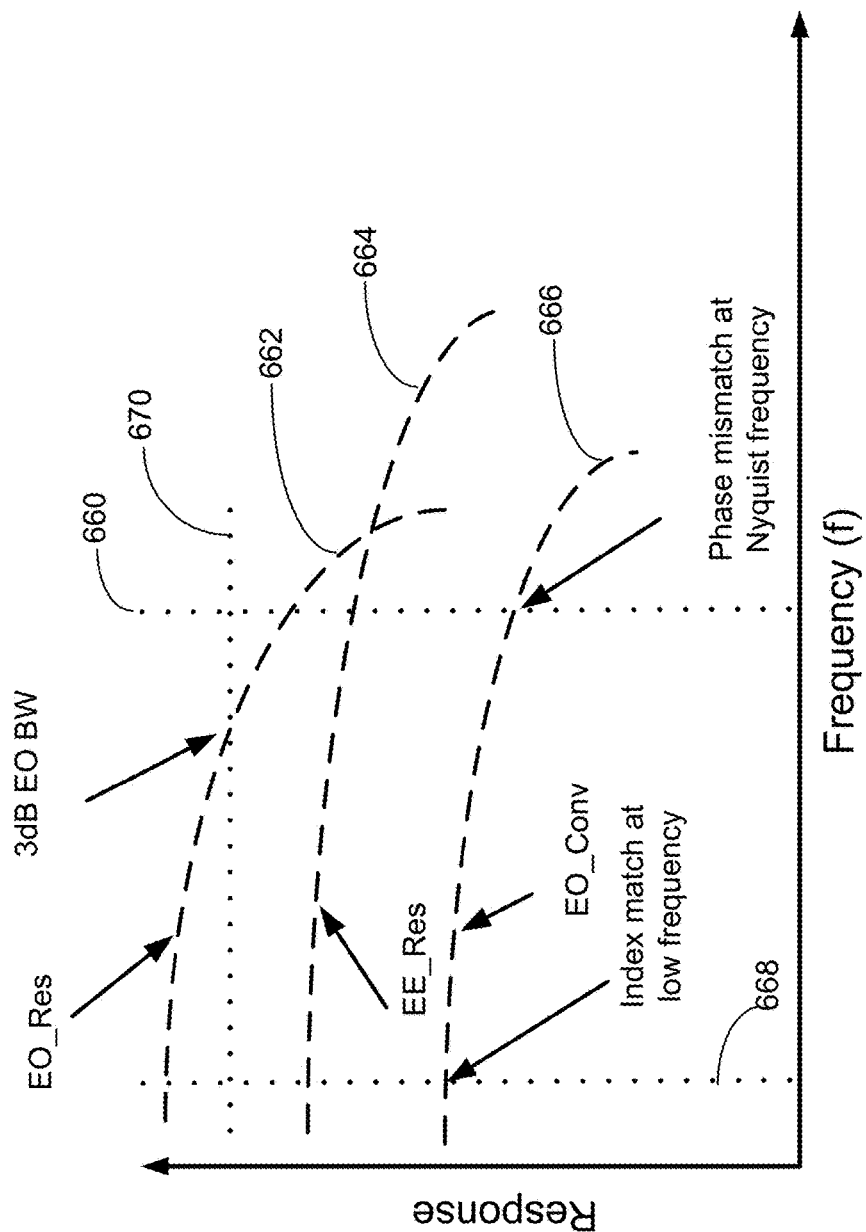
FIG. 6 shows a graph that illustrates a legacy phase match method at a low frequency.

FIG. 6 shows a graph that illustrates a legacy phase match method at a low frequency. In legacy designs, RF index and optical group index is matched at lower frequency 668, resulting in max EO conversion 666 at low frequency 668. However, conversion efficiency 666 will decrease with the increase in frequency due to the phase mismatch. Combined with electrical to electrical (EE) response 664 decreases with the increase in frequency, the decreased EO response 662 due to phase mismatch will be enhanced at high frequency, which causes a fast roll off at the high frequency response. This will result in not only the decrease of modulation bandwidth 670, but also the decrease of modulation efficiency at Nyquist frequency 660 due to phase mismatch.

Figure 7A:
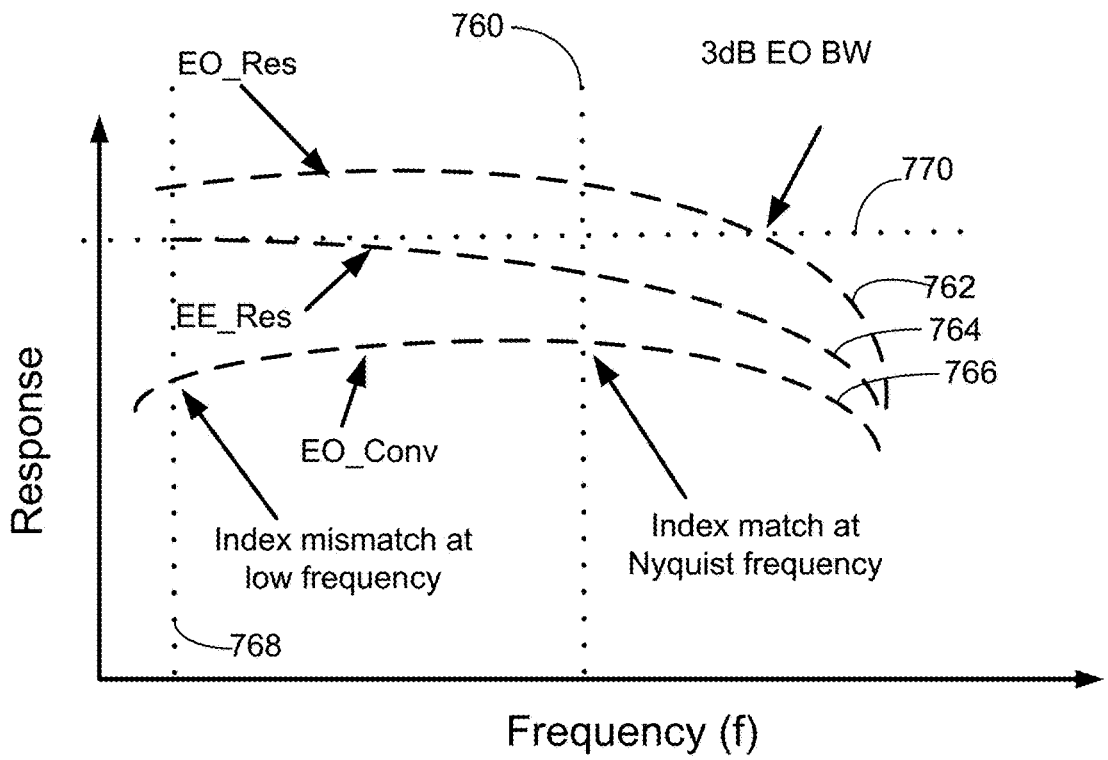
FIGS. 7A-7B show graphs that illustrate a phase match at a Nyquist frequency and phase match at a frequency higher than the Nyquist frequency, in accordance with various embodiments.
Figure 7B:
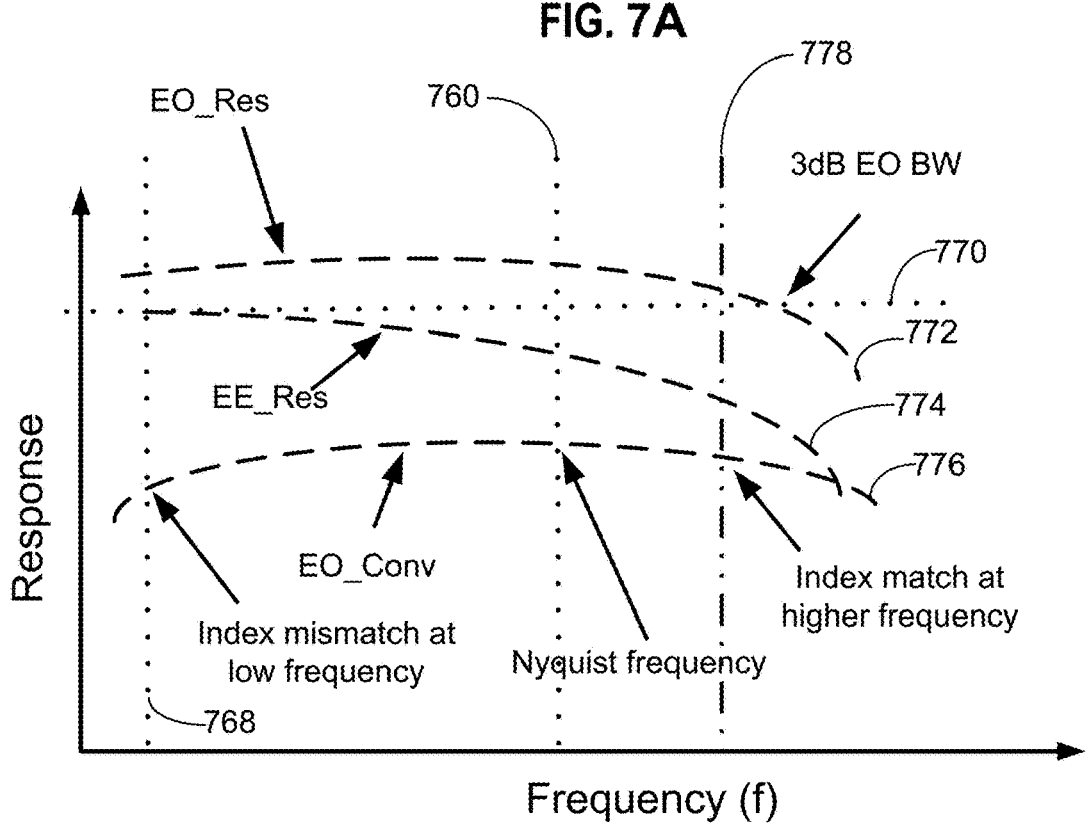

FIGS. 7A-7B show graphs that illustrate a phase match at a Nyquist frequency and phase match at a frequency higher than the Nyquist frequency, in accordance with various embodiments. In embodiments, phase match is designed at a Nyquist frequency or higher. The high-speed characterization of an optical modulation signal has strong dependence on the EO response at and near the Nyquist frequency. In embodiments, a design will match the RF index with optical group index at or near the Nyquist frequency (e.g. >50 GHz) equal to half of baud rate (e.g. >100 Gbaud). Therefore, a maximum EO conversion will occur at or near the Nyquist frequency and thus result in modulation efficiency.

FIG. 7A shows a phase match at the Nyquist frequency 760. FIG. 7B shows a phase match at a frequency higher than the Nyquist frequency 778. Furthermore, with the maximum EO conversion 766 or 776 at or near the Nyquist frequency, further extended bandwidth will be achieved with the EO flat response 762 or 772 in a wider frequency range because the higher EE RF response 764 or 774 at lower frequency 768 can compensate for the decrease of EO conversion efficiency 766 or 776 at lower frequency 768 due to phase mismatch. Phase match at frequency higher than Nyquist frequency can further help improve EO bandwidth 770 by maximizing modulation efficiency at the higher frequency although the modulation efficiency may decrease at Nyquist frequency. In addition, the decrease in modulation efficiency at Nyquist frequency due to the mismatch can be controlled to maintain for the wide EO bandwidth.

Figure 8:
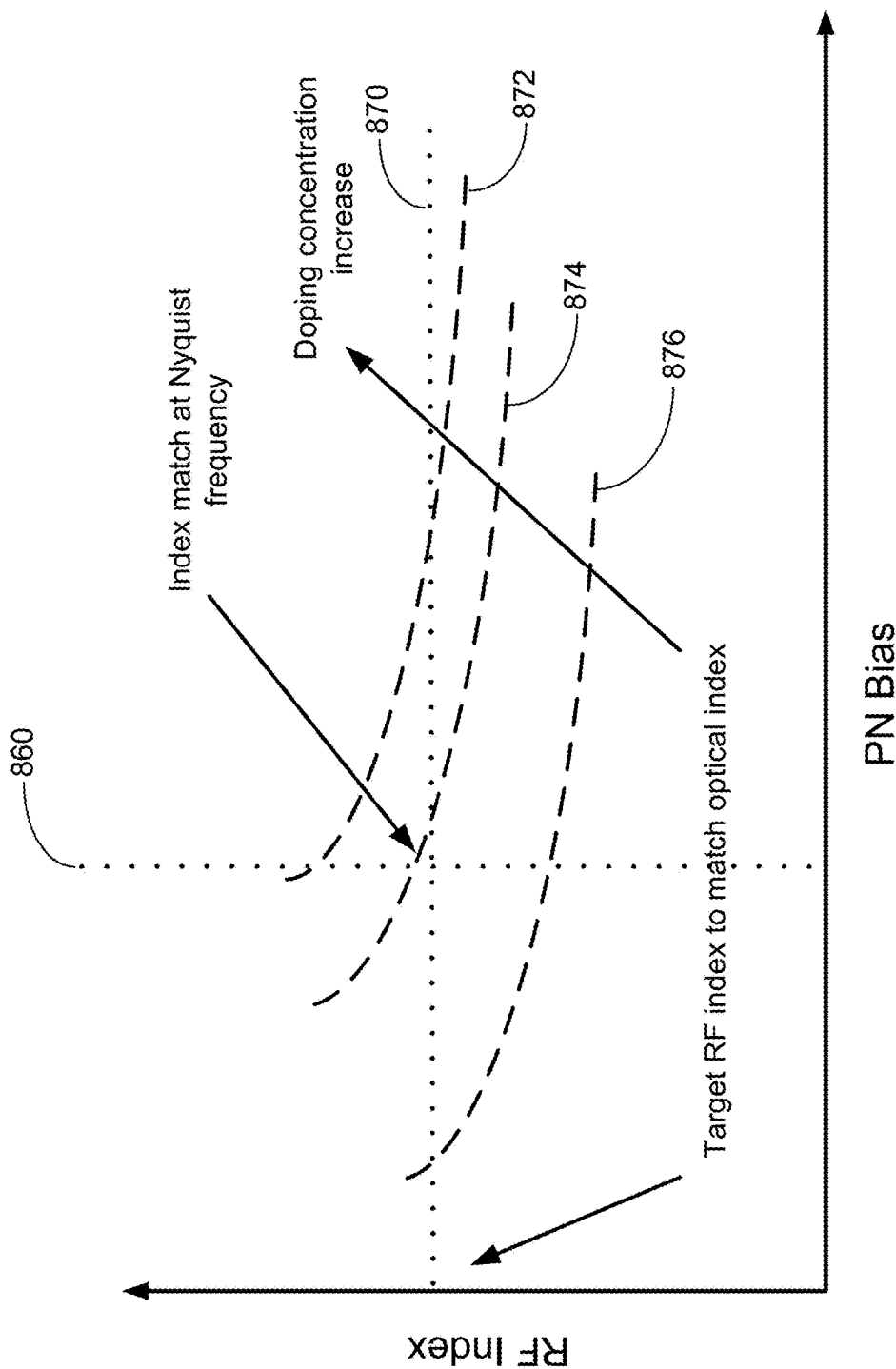
FIG. 8 shows a graph that illustrates phase match changes using doping, PN bias, and RF waveguides, in accordance with various embodiments.

FIG. 8 shows a graph that illustrates phase match changes using doping, PN bias, and RF waveguides, in accordance with various embodiments. This approach can maintain two symmetric optical waveguides with a push-pull PN structure at ultra-high-speed operation. SS RF TW design with phase match can be achieved via doping, PN bias and RF waveguide optimization for ultra-high-speed modulation response and efficiency. Because the optical index is independent with respect to doping concentration and profile as well as PN bias, the RF index can be adjusted to match optical index by optimizing doping concentration and profile as well as PN bias and RF TW to achieve ultra-high-speed modulation response and efficiency. As shown, as the doping concentration increases in the direction shown, a different set of level curves 872, 874, 876 may be generated. Thus, the doping concentration may be identified and said at a target RF index level 870 that corresponds with a match at the Nyquist frequency 860. With respect to FIG. 8, the match may be obtained at level curves 874.

Figure 9:
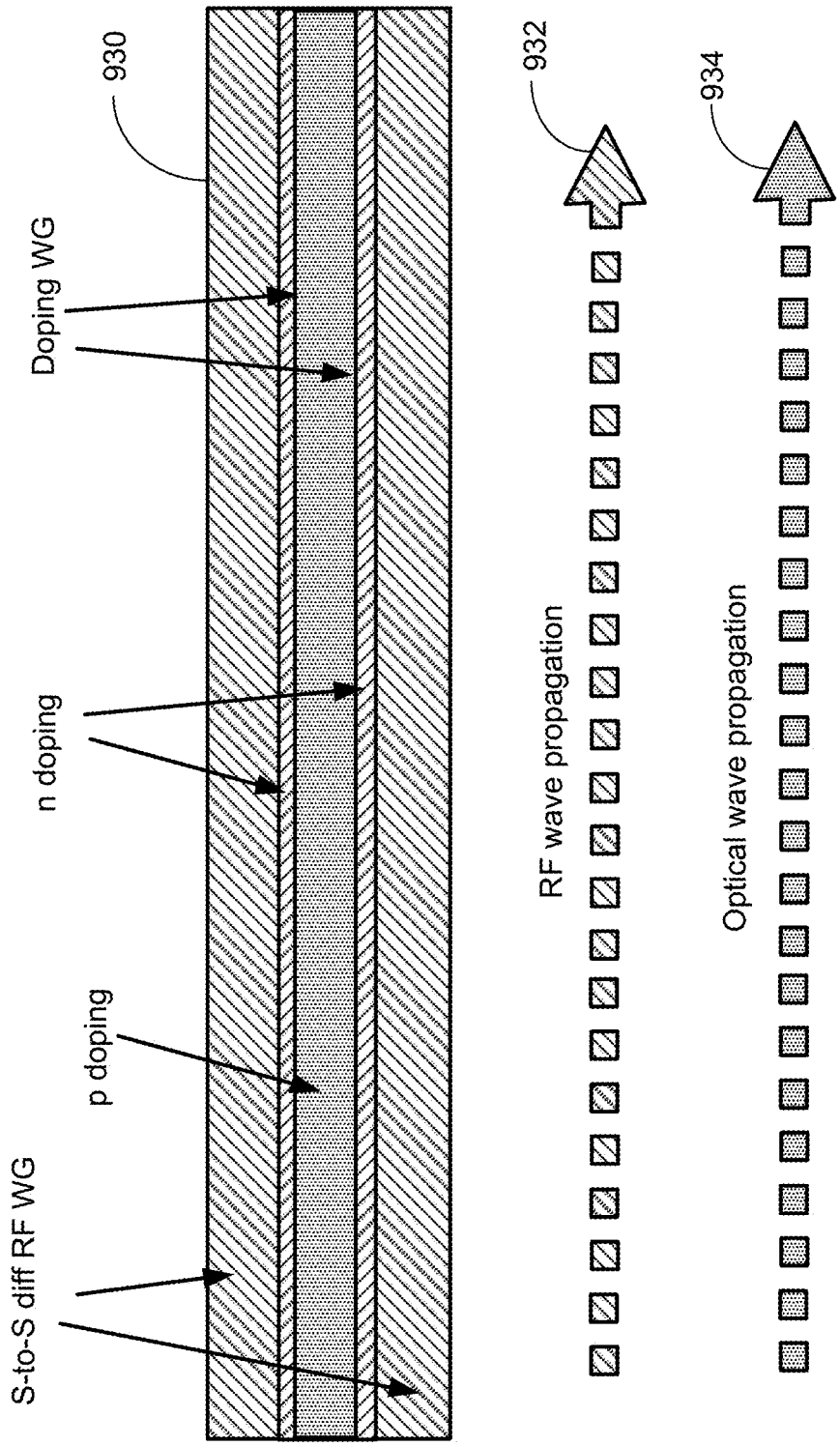
FIG. 9 shows a diagram that illustrates optical and RF wave propagation along doping within a TW, in accordance with various embodiments.

FIG. 9 shows a diagram that illustrates optical and RF wave propagation along doping within a TW, in accordance with various embodiments. The silicon modulator 930, which may be similar to silicon modulator 330 of FIG. 3, is shown along with the RF wave propagation direction 932, and the optical wave propagation 934.

Impedance Mismatch

Figure 10:
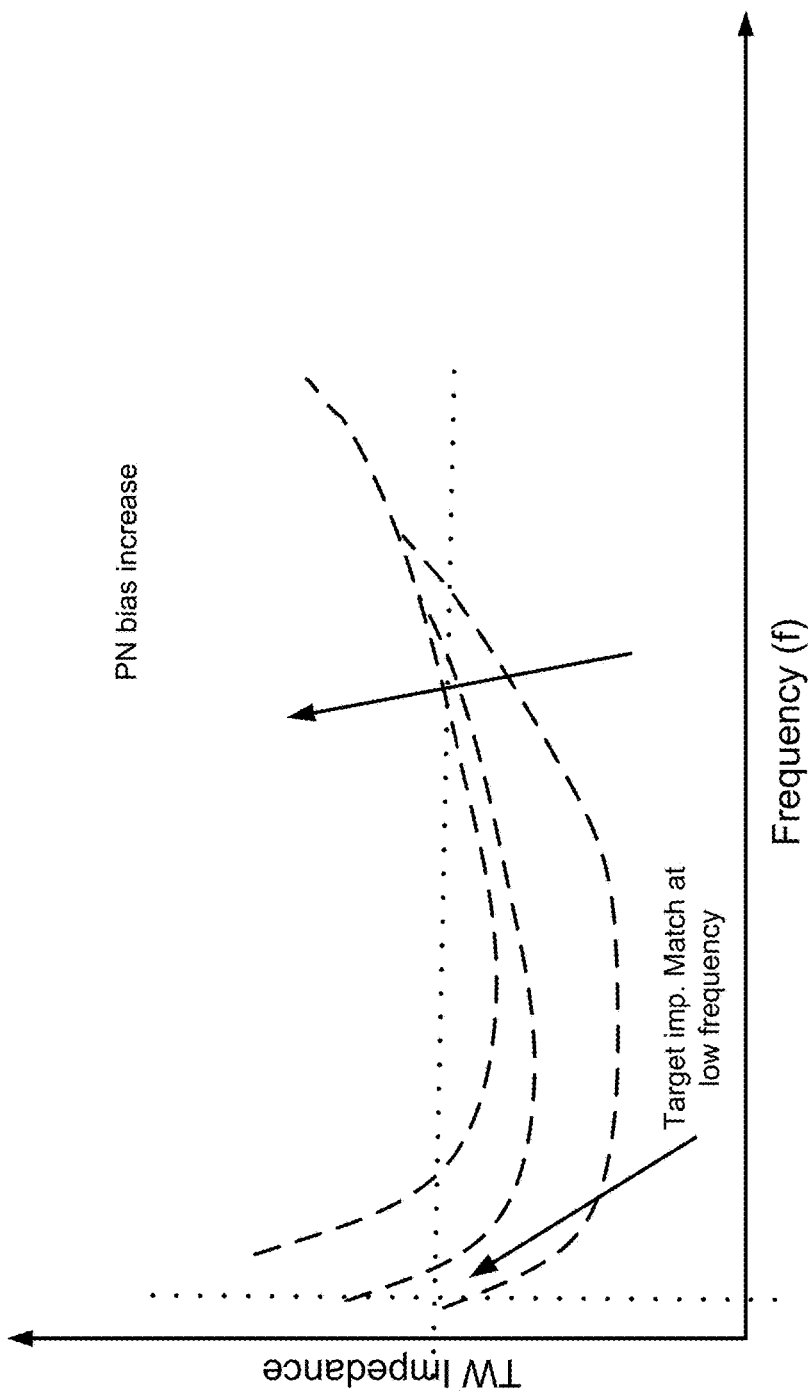
FIG. 10 shows a graph that illustrates typical TW impedance characteristics for legacy implementations for impedance match at a low frequency.

FIG. 10 shows a graph that illustrates typical TW impedance characteristics for legacy implementations for impedance match at a low frequency. Characteristic impedance in a traveling waveguide under doping condition is RF frequency dependent. The impedance match is required to minimize the back reflection and maximize the modulation efficiency of the traveling waveguide. Legacy implementations for impedance match is to use the terminal resistor to match traveling waveguide impedance at low frequency. This legacy implementation will result in impedance mismatch at high frequency which cause high back refection and deteriorate the performances of optical modulation characterization.

Figure 11:
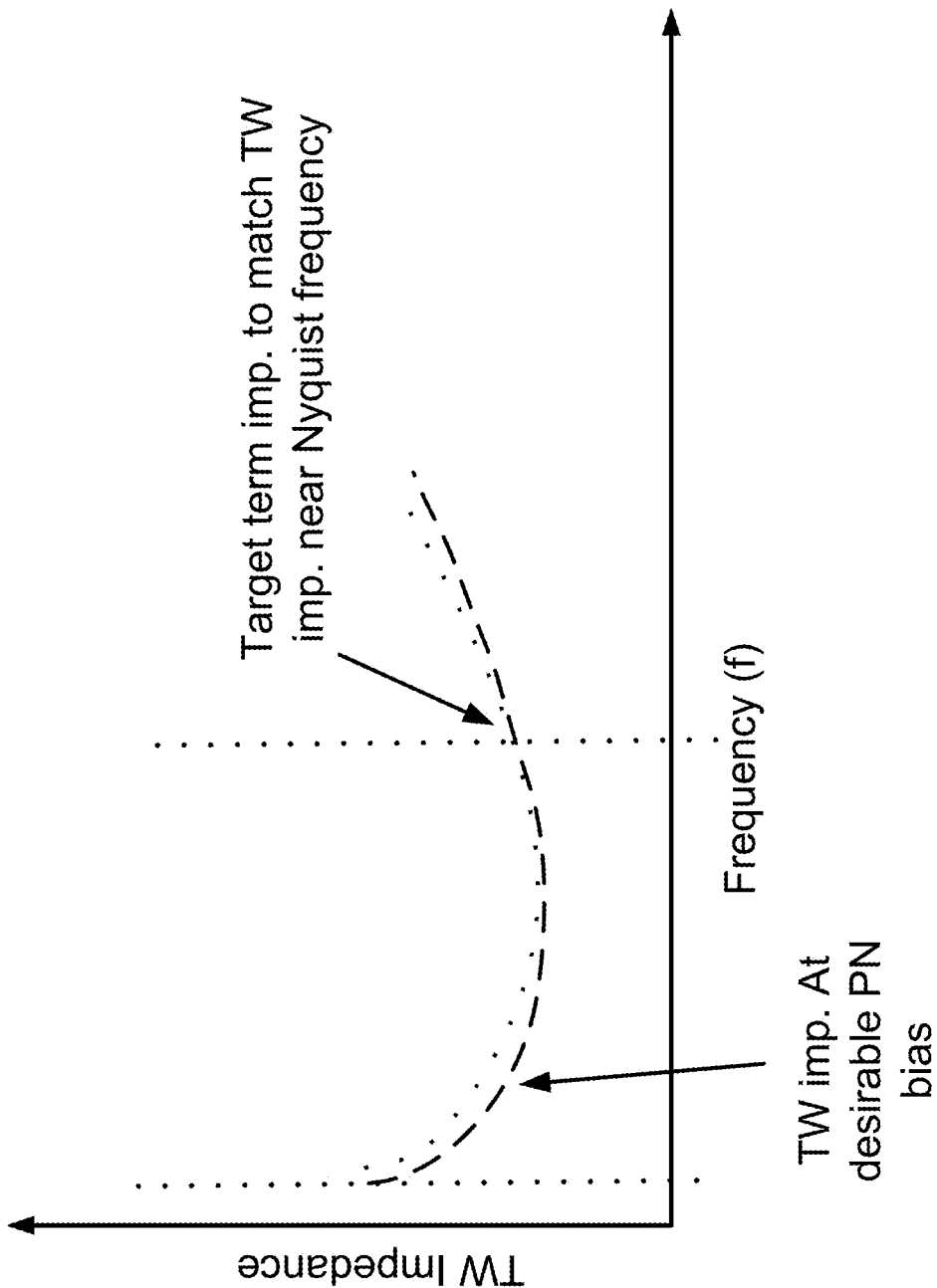
FIG. 11 shows a graph that illustrates impedance match via an RF terminal network, in accordance with various embodiments.
Figure 12:
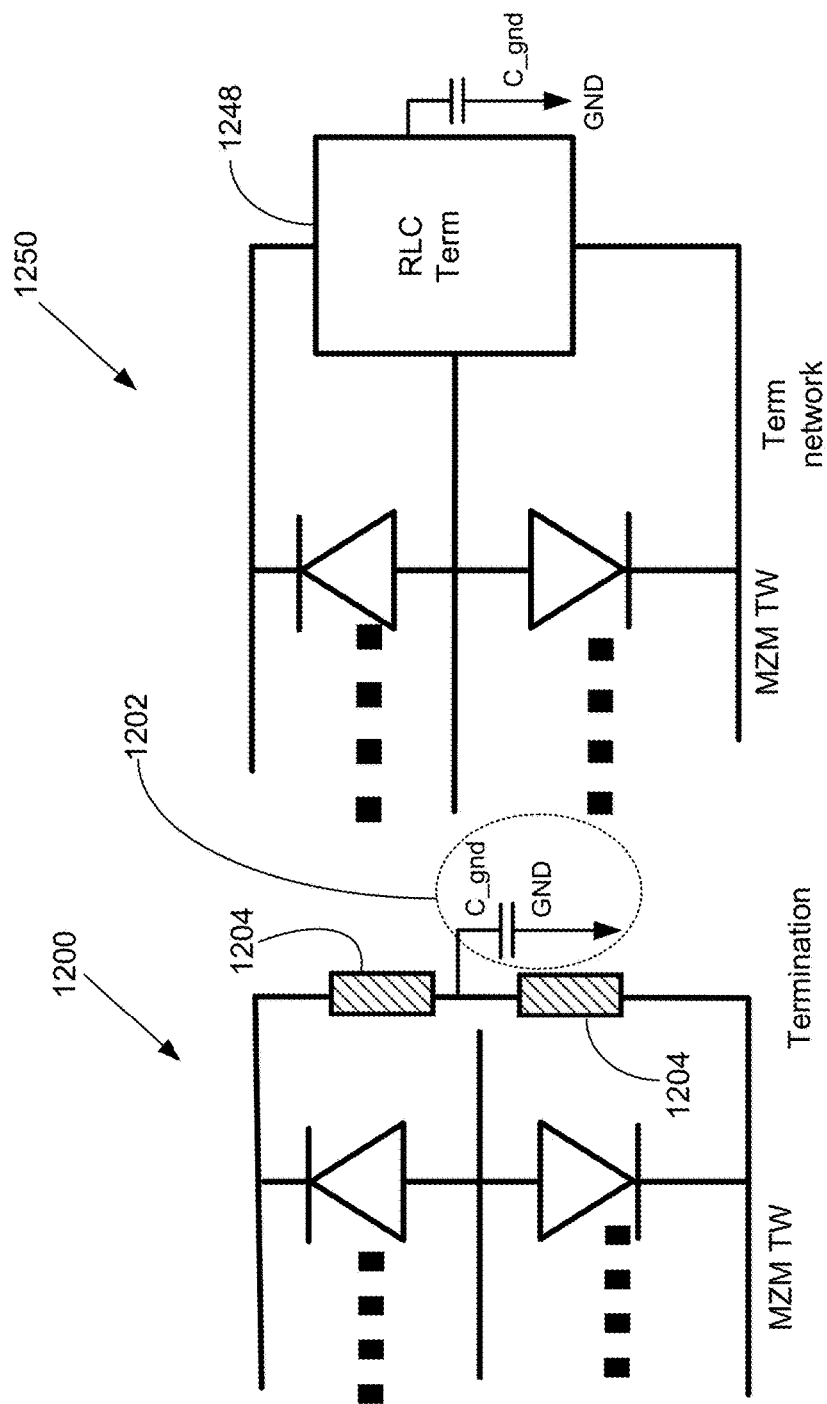
FIG. 12 shows a legacy termination implementation, and a RLC termination in accordance with various embodiments.

FIG. 11 shows a graph that illustrates impedance match via an RF terminal network, in accordance with various embodiments. As traveling waveguide impedance is PN bias dependent due to their RC characterizations, impedance design needs to consider the PN bias impact. In embodiments, a RF terminal network, as shown in diagram 1250 of FIG. 12, is designed with a terminal impedance to match characteristic impedance of the traveling waveguide in a wide range of operating frequencies at or near the Nyquist frequency to eliminate the back reflection and thus the deterioration for modulation signal. The termination impedance needs to be designed to match the TW impedance under the PN bias operation as the TW waveguide termination is dependent on the PN bias. The impedance match at or near Nyquist frequency will have minimized back reflection at or near Nyquist frequency and thus eliminate the deterioration of ultra-high speed modulation signal, compared with one with impedance match at low frequency, which has high back reflection at or near Nyquist frequency and thus cause performance deterioration of high speed modulation signal.

FIG. 12 shows a legacy termination implementation, and a RLC termination in accordance with various embodiments. Diagram 1200 shows a legacy implementation, where a differential termination is accomplished using two symmetric resistors while a capacitor coupled with the ground 1202 is to provide RF ground termination for different SS TW without GND.

Diagram 1250 shows an embodiment where an RLC termination 1248, which may be similar to 348 of FIG. 3, is inserted. Implementation details of the RLC termination 1248 is described below with respect to FIG. 13.

Figure 13:
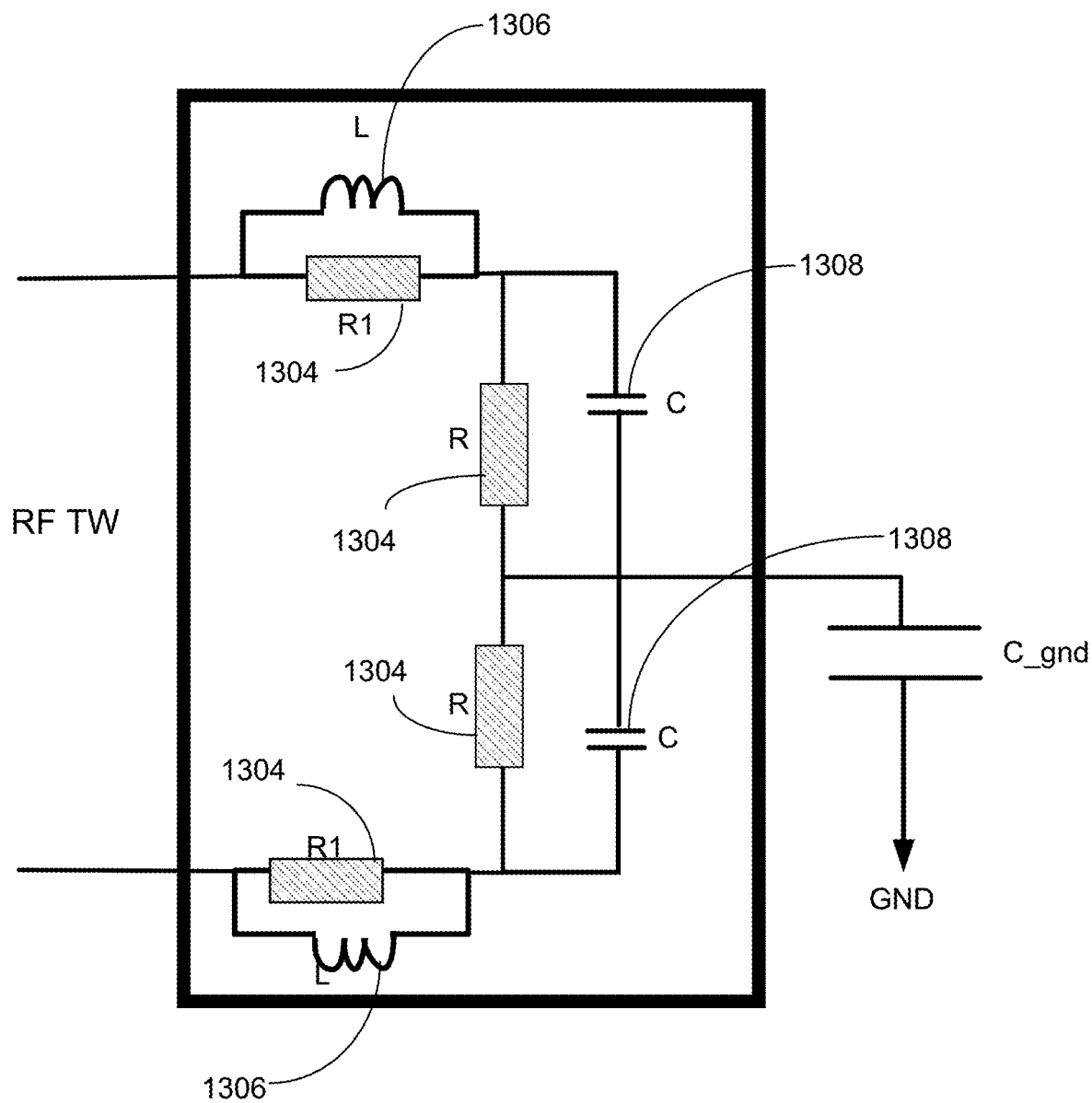
FIG. 13 is a block diagram that shows a RLC termination network for RF termination, in accordance with various embodiments.

FIG. 13 is a block diagram that shows a RLC termination network for RF termination, in accordance with various embodiments. In embodiments, impedance match design can be achieved with RLC network. For TW MZM, the frequency dependence of traveling waveguide impedance can be a complex number, which can be expressed by:

$$Z = R + jX \quad (6)$$

Where Z is impedance of TW, R is resistance or the real part, and X is reactance or the imaginary part. The legacy termination technique, as shown in diagram 1200 of FIG. 12, uses terminal resistors 1204 to match the resistance of traveling waveguide impedance (e.g. the real part) at low frequency. The impedance at high frequency will have mismatch due to the frequency dependence of traveling waveguide impedance including the imaginary part.

In embodiments, the terminal impedance network to design terminal impedance to match the frequency dependent impedance of TW under the desirable PN bias conditions, via a match method of impedance in a complex format including both real part and imaginary part. A RLC network can be designed as example for the match of the magnitude and phase between terminal impedance and TW impedance over wideband operating frequency range around Nyquist frequency. In embodiments, an on-chip RLC is used to eliminate parasitic impact for ultra-high-speed applications, and may include one or more resistors 1304 inductors 1306, and/or capacitors 1308.

Furthermore, a driver is often used to booster RF signal for modulator and compensate high frequency response with equalization, which requires co-design driver and modulator. Terminal impedance network can be used in the co-design to optimize overall frequency response of driver and modulation and thus optimize the performance of modulation signal.

Figure 14:
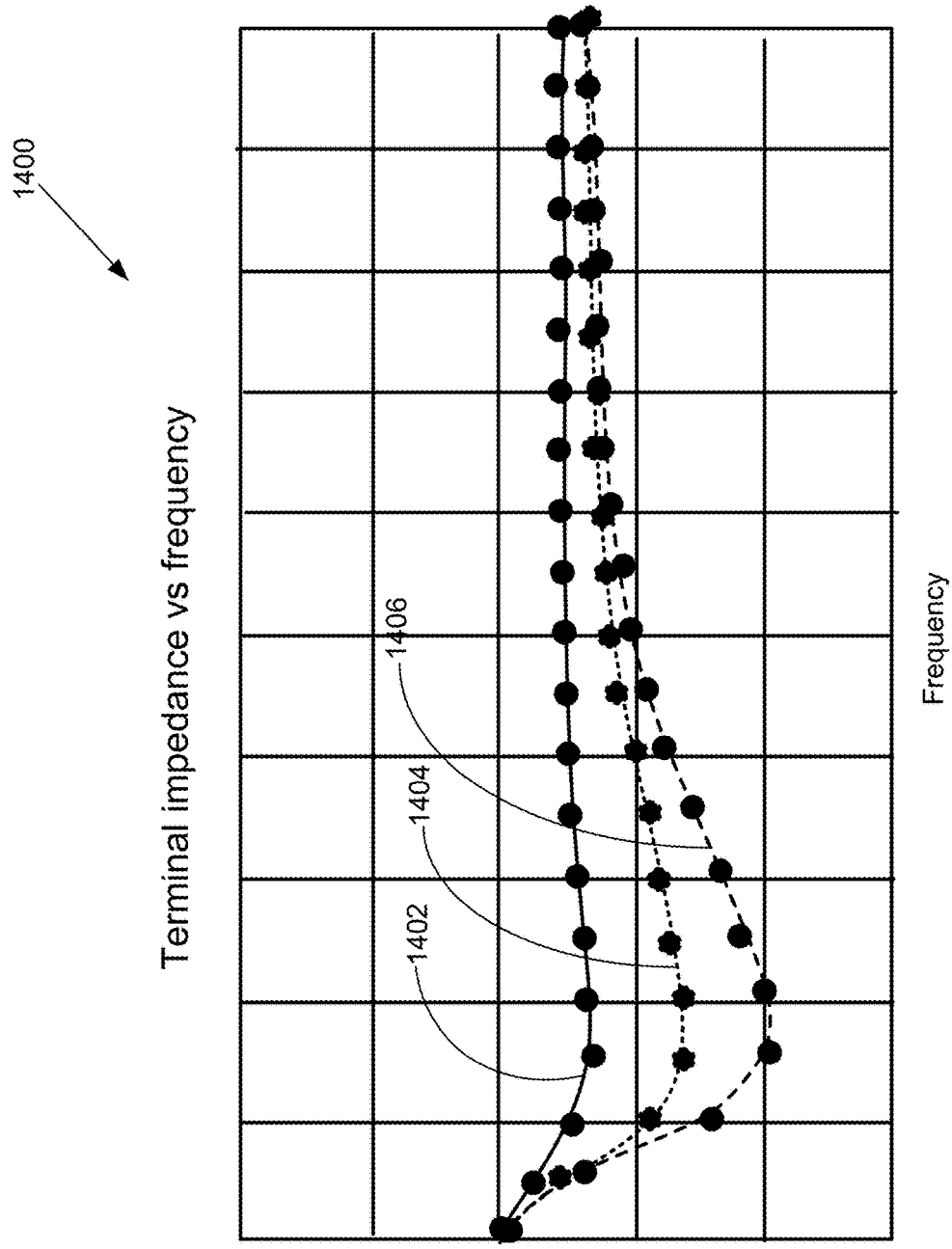
FIG. 14 shows a graph that illustrates terminal impedance using a RLC network for various frequencies, in accordance with various embodiments.

FIG. 14 shows a graph that illustrates terminal impedance using a RLC network for various frequencies, in accordance with various embodiments. Graph 1400 shows a relationship between terminal impedance versus frequency with different parameters 1402, 1404, 1406 in RLC circuit as shown in FIG. 13, which can be used to match TW impedance similar to FIG. 10.

Figure 15:
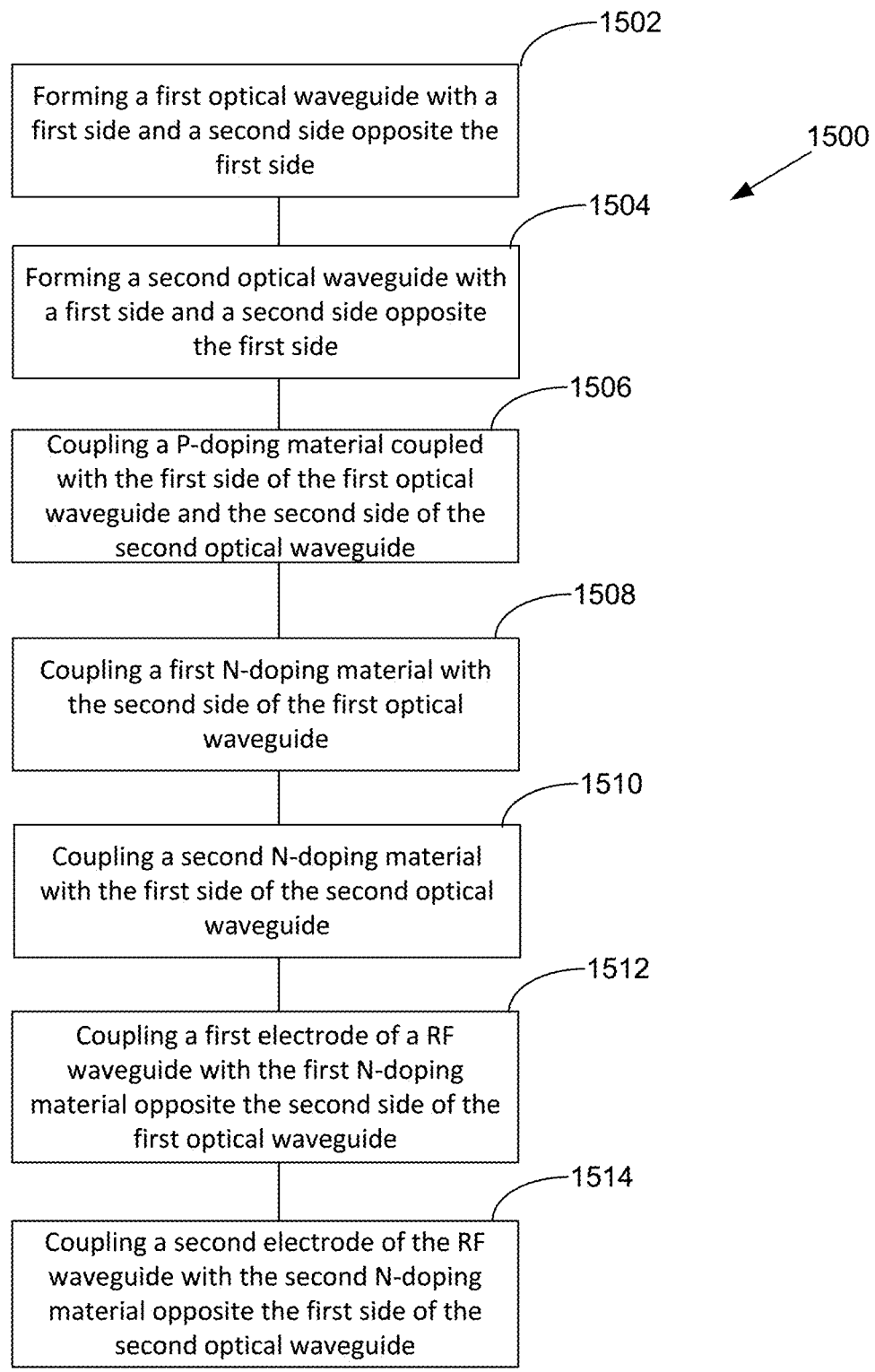
FIG. 15 illustrates a process for forming a TW, in accordance with various embodiments.

FIG. 15 illustrates a process 1500 for forming a TW, in accordance with various embodiments. Process 1500 may be performed by any apparatus, technique, process, or system described herein, and in particular with respect to FIG. 1-FIG. 14.

At block 1502, the process may include forming a first optical waveguide with a first side and a second side opposite the first side.

At block 1504, the process may further include forming a second optical waveguide with a first side and a second side opposite the first side;

At block 1506, the process may further include coupling a P-doping material coupled with the first side of the first optical waveguide and the second side of the second optical waveguide.

At block 1508, the process may further include coupling a first N-doping material with the second side of the first optical waveguide.

At block 1510, the process may further include coupling a second N-doping material with the first side of the second optical waveguide.

At block 1512, the process may further include coupling a first electrode of a RF waveguide with the first N-doping material opposite the second side of the first optical waveguide.

At block 1514, the process may further include coupling a second electrode of the RF waveguide with the second N-doping material opposite the first side of the second optical waveguide.

In embodiments, the SS RF TW can be achieved by two RF signal metal traces. Any other features which are compatible with SS TW can be used to improve RF EE response or phase match, for example stack-up metal layers for RF signal traces to reduce RF loss, or T-rail structures to adjust the RF index, or introducing extra RF TW length or optical WG length to adjust the phase, or introducing features in optical waveguide structure to adjust optical index for the phase match with RF waveguide. Embodiments may facilitate a maximum EO modulation efficiency and BW.

A low loss RF TW tends to have a high frequency dependence on RF index for ultra-high-speed operation, which will have low modulation efficiency and BW if the legacy method to have phase match at low frequency is used. However, in embodiments, the modulation efficiency and BW can be improved by designing the phase match at the Nyquist frequency or higher described herein. Techniques described herein for phase compensation and impedance match described with SS RF TW can be applied to other similar RF TW structures. In addition, techniques described herein for phase compensation and impedance match can be applied to any material platform such as silicon photonics or InP material base TW modulators.

Figure 16:
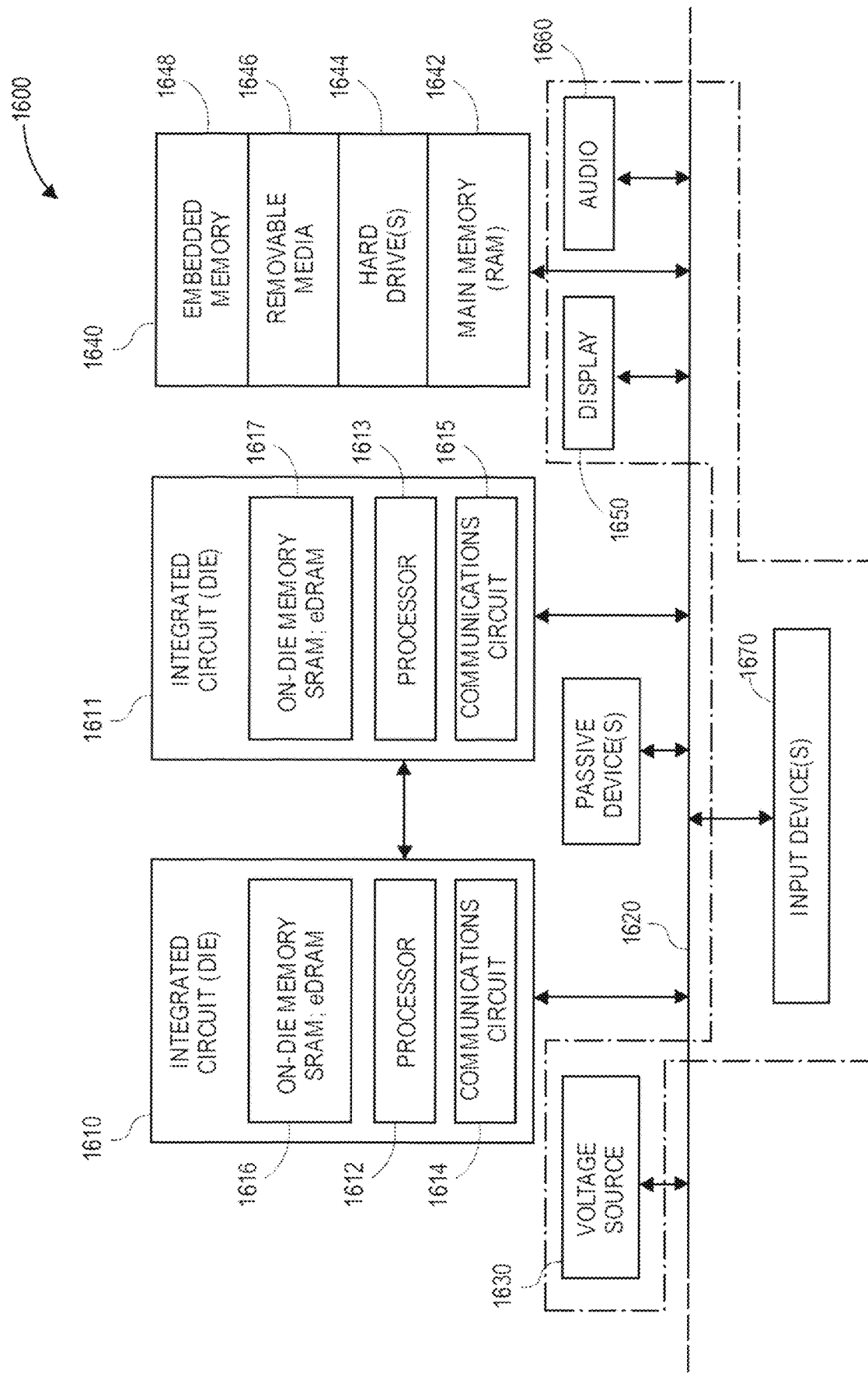
FIG. 16 schematically illustrates a computing device, in accordance with various embodiments.

FIG. 16 schematically illustrates a computing device, in accordance with various embodiments. FIG. 16 is a schematic of a computer system 1600, in accordance with an embodiment of the present invention. The computer system 1600 (also referred to as the electronic system 1600) as depicted can embody a traveling waveguide to facilitate phase match and impedance match, according to any of the several disclosed embodiments and their equivalents as set forth in this disclosure. The computer system 1600 may be a mobile device such as a netbook computer. The computer system 1600 may be a mobile device such as a wireless smart phone. The computer system 1600 may be a desktop computer. The computer system 1600 may be a hand-held reader. The computer system 1600 may be a server system. The computer system 1600 may be a supercomputer or high-performance computing system.

In an embodiment, the electronic system 1600 is a computer system that includes a system bus 1620 to electrically couple the various components of the electronic system 1600. The system bus 1620 is a single bus or any combination of busses according to various embodiments. The electronic system 1600 includes a voltage source 1630 that provides power to the integrated circuit 1610. In some embodiments, the voltage source 1630 supplies current to the integrated circuit 1610 through the system bus 1620.

The integrated circuit 1610 is electrically coupled to the system bus 1620 and includes any circuit, or combination of circuits according to an embodiment. In an embodiment, the integrated circuit 1610 includes a processor 1612 that can be of any type. As used herein, the processor 1612 may mean any type of circuit such as, but not limited to, a microprocessor, a microcontroller, a graphics processor, a digital signal processor, or another processor. In an embodiment, the processor 1612 includes, or is coupled with, a traveling waveguide to facilitate phase match and impedance match, as disclosed herein. In an embodiment, SRAM embodiments are found in memory caches of the processor. Other types of circuits that can be included in the integrated circuit 1610 are a custom circuit or an application-specific integrated circuit (ASIC), such as a communications circuit 1614 for use in wireless devices such as cellular telephones, smart phones, pagers, portable computers, two-way radios, and similar electronic systems, or a communications circuit for servers. In an embodiment, the integrated circuit 1610 includes on-die memory 1616 such as static random-access memory (SRAM). In an embodiment, the integrated circuit 1610 includes embedded on-die memory 1616 such as embedded dynamic random-access memory (eDRAM).

In an embodiment, the integrated circuit 1610 is complemented with a subsequent integrated circuit 1611. Useful embodiments include a dual processor 1613 and a dual communications circuit 1615 and dual on-die memory 1617 such as SRAM. In an embodiment, the dual integrated circuit 1610 includes embedded on-die memory 1617 such as eDRAM.

In an embodiment, the electronic system 1600 also includes an external memory 1640 that in turn may include one or more memory elements suitable to the particular application, such as a main memory 1642 in the form of RAM, one or more hard drives 1644, and/or one or more drives that handle removable media 1646, such as diskettes, compact disks (CDs), digital variable disks (DVDs), flash memory drives, and other removable media known in the art. The external memory 1640 may also be embedded memory 1648 such as the first die in a die stack, according to an embodiment.

In an embodiment, the electronic system 1600 also includes a display device 1650, an audio output 1660. In an embodiment, the electronic system 1600 includes an input device such as a controller 1670 that may be a keyboard, mouse, trackball, game controller, microphone, voice-recognition device, or any other input device that inputs information into the electronic system 1600. In an embodiment, an input device 1670 is a camera. In an embodiment, an input device 1670 is a digital sound recorder. In an embodiment, an input device 1670 is a camera and a digital sound recorder.

As shown herein, the integrated circuit 1610 can be implemented in a number of different embodiments, including a traveling waveguide to facilitate phase match and impedance match, according to any of the several disclosed embodiments and their equivalents, an electronic system, a computer system, one or more methods of fabricating an integrated circuit, and one or more methods of fabricating an electronic assembly that includes a traveling waveguide to facilitate phase match and impedance match, according to any of the several disclosed embodiments as set forth herein in the various embodiments and their art-recognized equivalents. The elements, materials, geometries, dimensions, and sequence of operations can all be varied to suit particular I/O coupling requirements including array contact count, array contact configuration for a microelectronic die embedded in a processor mounting substrate according to any of the several disclosed traveling waveguide to facilitate phase match and impedance match embodiments and their equivalents. A foundation substrate may be included, as represented by the dashed line of FIG. 16. Passive devices may also be included, as is also depicted in FIG. 16.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

The following paragraphs describe examples of various embodiments.

EXAMPLES

Example 1 is a traveling waveguide comprising: a first optical waveguide with a first side and a second side opposite the first side; a second optical waveguide with a first side and a second side opposite the first side, wherein the second optical waveguide is substantially parallel to the first optical waveguide; a P-doping material coupled with the first side of the first optical waveguide and the second side of the second optical waveguide; a first N-doping material coupled with the second side of the first optical waveguide; a second N-doping material coupled with the first side of the second optical waveguide; a first electrode of a radiofrequency (RF) waveguide coupled with first N-doping material opposite the second side of the first optical waveguide; and a second electrode of the RF waveguide coupled with the second N-doping material opposite the first side of the second optical waveguide, to facilitate phase match and impedance match within the traveling waveguide.

Example 2 includes the traveling waveguide of example 1, wherein the P-doping material, the first N-doping material and the second N-doping material form a push-pull PN structure.

Example 3 includes the traveling waveguide of example 1, wherein the first electrode of the RF waveguide and the second electrode of the RF waveguide form a differential signal to signal structure.

Example 4 includes the traveling waveguide of example 1, wherein the RF waveguide is not directly electrically coupled with a physical ground.

Example 5 includes the traveling waveguide of example 1, wherein parameters of a selected one or more of the P-doping material, the first N-doping material, the second N-doping material, the first optical waveguide, the second optical waveguide, and the RF waveguide are based upon a phase match between optical wave and RF wave in the traveling waveguide during operation.

Example 6 includes the traveling waveguide of example 5, wherein the phase match is based upon a determined ultra-high-speed modulation response.

Example 7 includes the traveling waveguide of example 6, wherein the phase match is at a Nyquist frequency or higher than a Nyquist frequency of modulation signals during operation.

Example 8 includes the traveling waveguide of example 5, wherein the parameters are based upon a selected one or more of: material composition, length, width, height, or gap between the first electrode and the second electrode of the RF waveguide.

Example 9 includes the traveling waveguide of example 1, further comprising a termination component coupled with an end of the RF waveguide.

Example 10 includes the traveling waveguide of example 9, wherein the termination component has an impedance based on an impedance of the RF waveguide.

Example 11 includes the traveling waveguide of example 9, wherein the termination component includes a RLC termination network.

Example 12 includes the traveling waveguide of example 1, wherein the first optical waveguide forms a portion of a first arm of a Mach-Zehnder modulator (MZM) and wherein the second optical waveguide forms a portion of a second arm of the MZM.

Example 13 includes the traveling waveguide of example 1, wherein the P-doping material extends along the first side of the first optical waveguide and along the second side of the second optical waveguide.

Example 14 includes the traveling waveguide of example 1, wherein the first electrode and the second electrode of the RF waveguide include a plurality of metal layers.

Example 15 includes the traveling waveguide of any one of examples 1-14, wherein the first electrode and the second electrode of the RF waveguide include metal features that are substantially perpendicular to a direction of the RF waveguide.

Example 16 is a method of forming a traveling waveguide, the method comprising: forming a first optical waveguide with a first side and a second side opposite the first side; forming a second optical waveguide with a first side and a second side opposite the first side; coupling a P-doping material coupled with the first side of the first optical waveguide and the second side of the second optical waveguide; coupling a first N-doping material with the second side of the first optical waveguide; coupling a second N-doping material with the first side of the second optical waveguide; coupling a first electrode of a radiofrequency (RF) waveguide with the first N-doping material opposite the second side of the first optical waveguide; and coupling a second electrode of the RF waveguide with the second N-doping material opposite the first side of the second optical waveguide.

Example 17 includes the method of example 16, wherein the second optical waveguide is substantially parallel to the first optical waveguide.

Example 18 includes the method of example 16, further comprising coupling a termination component with an end of the traveling waveguide.

Example 19 includes the method of example 18, wherein the termination component includes a RLC termination network coupled with an end of the RF waveguide, the RLC termination network with a terminal impedance based on an impedance of the RF waveguide over a range of operating frequencies.

Example 20 includes the method of example 19, wherein the termination component provides an impedance match with the RF waveguide.

Example 21 is a system comprising: a traveling waveguide, comprising: a first optical waveguide with a first side and a second side opposite the first side; a second optical waveguide with a first side and a second side opposite the first side, wherein the second optical waveguide is substantially parallel to the first optical waveguide; a P-doping material coupled with the first side of the first optical waveguide and the second side of the second optical waveguide; a first N-doping material coupled with the second side of the first optical waveguide; a second N-doping material coupled with the first side of the second optical waveguide; a first electrode of a radiofrequency (RF) waveguide coupled with first N-doping material opposite the second side of the first optical waveguide; and a second electrode of the RF waveguide coupled with the second N-doping material opposite the first side of the second optical waveguide; a termination component coupled with the RF waveguide at an end of the traveling waveguide; and an RF driver electrically coupled with the first electrode of the RF waveguide and with the second electrode of the RF waveguide at an end of the traveling waveguide opposite the termination component.

Example 22 includes the system of example 21, wherein the termination component includes a RLC termination network.

Example 23 includes the system of example 22, wherein the RLC termination network is designed to have a matched termination over a range of operating frequencies.

Example 24 includes the system of any one of examples 21-23, wherein the first optical waveguide forms a portion of a first arm of a Mach-Zehnder modulator (MZM) and wherein the second optical waveguide forms a portion of a second arm of the MZM.

What is claimed is:
1. A traveling waveguide comprising:
a first optical waveguide with a first side and a second side opposite the first side;
a second optical waveguide with a first side and a second side opposite the first side, wherein the second optical waveguide is substantially parallel to the first optical waveguide;
a P-doping material coupled with the first side of the first optical waveguide and the second side of the second optical waveguide;
a first N-doping material coupled with the second side of the first optical waveguide;
a second N-doping material coupled with the first side of the second optical waveguide;
a first electrode of a radiofrequency (RF) waveguide coupled with the first N-doping material opposite the second side of the first optical waveguide;
a second electrode of the RF waveguide coupled with the second N-doping material opposite the first side of the second optical waveguide, to facilitate phase match and impedance match within the traveling waveguide; and
a termination component coupled with an end of the RF waveguide, wherein the termination component has an impedance that is based on an impedance of the RF waveguide and that is selected to reduce back reflection of the RF waveguide when the traveling waveguide is operating at a Nyquist frequency.
2. The traveling waveguide of claim 1, wherein the P-doping material, the first N-doping material, and the second N-doping material form a push-pull PN structure.

3. The traveling waveguide of claim 1, wherein the first electrode of the RF waveguide and the second electrode of the RF waveguide form a differential signal-to-signal structure.

4. The traveling waveguide of claim 1, wherein the RF waveguide is not directly electrically coupled with a physical ground.

5. The traveling waveguide of claim 1, wherein parameters of a selected one or more of the P-doping material, the first N-doping material, the second N-doping material, the first optical waveguide, the second optical waveguide, and the RF waveguide are based upon a phase match between optical wave and RF wave in the traveling waveguide during operation.

6. The traveling waveguide of claim 5, wherein the phase match is based upon a determined ultra-high-speed modulation response.

7. The traveling waveguide of claim 6, wherein the phase match is at the Nyquist frequency or higher than a Nyquist frequency of modulation signals during operation.

8. The traveling waveguide of claim 5, wherein the parameters are based upon a selected one or more of: material composition, length, width, height, or gap between the first electrode and the second electrode of the RF waveguide.

9. The traveling waveguide of claim 1, wherein the termination component includes a RLC termination network.

10. The traveling waveguide of claim 1, wherein the first optical waveguide forms a portion of a first arm of a Mach-Zehnder modulator (MZM) and wherein the second optical waveguide forms a portion of a second arm of the MZM.

11. The traveling waveguide of claim 1, wherein the P-doping material extends along the first side of the first optical waveguide and along the second side of the second optical waveguide.

12. The traveling waveguide of claim 1, wherein the first electrode and the second electrode of the RF waveguide include a plurality of metal layers.

13. The traveling waveguide of claim 1, wherein the first electrode and the second electrode of the RF waveguide include metal features that are substantially perpendicular to a direction of the RF waveguide.

14. A method of forming a traveling waveguide, the method comprising:
   forming a first optical waveguide with a first side and a second side opposite the first side;
   forming a second optical waveguide with a first side and a second side opposite the first side;
   coupling a P-doping material coupled with the first side of the first optical waveguide and the second side of the second optical waveguide;
   coupling a first N-doping material with the second side of the first optical waveguide;
   coupling a second N-doping material with the first side of the second optical waveguide;
   coupling a first electrode of a radiofrequency (RF) waveguide with the first N-doping material opposite the second side of the first optical waveguide;
   coupling a second electrode of the RF waveguide with the second N-doping material opposite the first side of the second optical waveguide; and
   coupling a termination component with an end of the RF waveguide, wherein the termination component has an impedance that is based on an impedance of the RF waveguide and that is selected to reduce back reflection of the RF waveguide when the traveling waveguide is operating at a Nyquist frequency.

15. The method of claim 14, wherein the second optical waveguide is substantially parallel to the first optical waveguide.

16. The method of claim 14, wherein the termination component includes a RLC termination network coupled with an end of the RF waveguide, the RLC termination network with a terminal impedance based on an impedance of the RF waveguide over a range of operating frequencies that include the Nyquist frequency.

17. A system comprising:
   a traveling waveguide, comprising:
      a first optical waveguide with a first side and a second side opposite the first side;
      a second optical waveguide with a first side and a second side opposite the first side, wherein the second optical waveguide is substantially parallel to the first optical waveguide;
      a P-doping material coupled with the first side of the first optical waveguide and the second side of the second optical waveguide;
      a first N-doping material coupled with the second side of the first optical waveguide;
      a second N-doping material coupled with the first side of the second optical waveguide;
      a first electrode of a radiofrequency (RF) waveguide coupled with first N-doping material opposite the second side of the first optical waveguide; and
      a second electrode of the RF waveguide coupled with the second N-doping material opposite the first side of the second optical waveguide;
   a termination component coupled with the RF waveguide at an end of the traveling waveguide, wherein the termination component has an impedance that is based on an impedance of the traveling waveguide and that is selected to reduce back reflection of the RF waveguide when the traveling waveguide is operating at a Nyquist frequency; and
   an RF driver electrically coupled with the first electrode of the RF waveguide and with the second electrode of the RF waveguide at an end of the traveling waveguide opposite the termination component.

18. The system of claim 17, wherein the termination component includes a RLC termination network.

19. The system of claim 18, wherein the RLC termination network is designed to have a matched termination over a range of operating frequencies.

20. The system of claim 17, wherein the first optical waveguide forms a portion of a first arm of a Mach-Zehnder modulator (MZM) and wherein the second optical waveguide forms a portion of a second arm of the MZM.

* * * * *